(12) United States Patent
Noh et al.

(10) Patent No.: US 12,098,465 B2
(45) Date of Patent: Sep. 24, 2024

(54) COATING WEIGHT CONTROL APPARATUS AND COATING WEIGHT CONTROL METHOD

(71) Applicant: POSCO, Pohang-si (KR)

(72) Inventors: Ilhwan Noh, Pohang-si (KR); Won-Ho Lee, Pohang-si (KR); Taein Jang, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 384 days.

(21) Appl. No.: 17/278,144

(22) PCT Filed: Aug. 21, 2019

(86) PCT No.: PCT/KR2019/010631
§ 371 (c)(1),
(2) Date: Apr. 27, 2021

(87) PCT Pub. No.: WO2020/060044
PCT Pub. Date: Mar. 26, 2020

(65) Prior Publication Data
US 2021/0348259 A1 Nov. 11, 2021

(30) Foreign Application Priority Data
Sep. 21, 2018 (KR) .................. 10-2018-0114322

(51) Int. Cl.
*C23C 2/20* (2006.01)
*C23C 2/00* (2006.01)
*C23C 2/40* (2006.01)

(52) U.S. Cl.
CPC .............. *C23C 2/20* (2013.01); *C23C 2/00* (2013.01); *C23C 2/003* (2013.01);
(Continued)

(58) Field of Classification Search
CPC .. C23C 2/20; C23C 2/00; C23C 2/003; C23C 2/40; C23C 2/51; C23C 2/00344; C23C 2/16; C23C 2/18; C23C 2/14
(Continued)

(56) References Cited

U.S. PATENT DOCUMENTS

| | | | | |
|---|---|---|---|---|
| 4,135,006 | A * | 1/1979 | Readal | G05D 5/03 73/150 R |
| 2004/0050323 | A1 * | 3/2004 | Chae | C23C 2/14 118/100 |
| 2008/0026134 | A1 | 1/2008 | Kayama | |

FOREIGN PATENT DOCUMENTS

| | | |
|---|---|---|
| CN | 101539781 | 8/2010 |
| CN | 103205665 | 7/2013 |

(Continued)

OTHER PUBLICATIONS

Edwards, et al., Coating Mass Control System Design for a Continuous Galvanizing Line, pp. 412-421.
(Continued)

*Primary Examiner* — Jessee R Roe
*Assistant Examiner* — Michael Aboagye
(74) *Attorney, Agent, or Firm* — CANTOR COLBURN LLP

(57) ABSTRACT

An apparatus for controlling coating weight coated on a strip by using an air knife disposed in a travelling direction of the strip in a continuous plating process in which the strip is dipped in a molten metal pot and is coated includes: a prediction model unit including a prediction model in which a neural network is trained with accumulated operation conditions; and an optimum air knife condition calculation unit configured to derive an absolute value of at least one of an air knife gap and an air knife pressure by using the prediction model based on an input operation condition.

13 Claims, 5 Drawing Sheets

(52) U.S. Cl.
CPC ............ *C23C 2/00344* (2022.08); *C23C 2/40* (2013.01); *C23C 2/51* (2022.08); *C23C 2/52* (2022.08)

(58) Field of Classification Search
USPC ......... 266/200; 118/400, 413, 665, 423, 100
See application file for complete search history.

(56) References Cited

FOREIGN PATENT DOCUMENTS

| | | | | |
|---|---|---|---|---|
| CN | 105525248 | | 4/2016 | |
| CN | 106167887 | * | 11/2016 | ............... C23C 2/06 |
| CN | 106435427 | | 2/2017 | |
| CN | 106637026 | | 5/2017 | |
| DE | 19756877 | | 7/1999 | |
| IN | 2071/CAL/1998 | | 12/2010 | |
| KR | 100584128 | | 5/2006 | |
| KR | 100815814 | | 3/2008 | |
| KR | 100815815 | | 3/2008 | |
| KR | 20080019543 | | 3/2008 | |
| KR | 20150022406 | | 3/2015 | |
| KR | 20160079199 | | 7/2016 | |
| KR | 101688384 | | 12/2016 | |
| TW | 201742696 | | 12/2017 | |

OTHER PUBLICATIONS

International Search Report—PCT/KR2019/010631 dated Nov. 28, 2019.
PCT Written Opinion—PCT/KR2019/010631 issued on Nov. 28, 2019.
European Search Report—European Application No. 19862948.7 issued on Jun. 24, 2021.

* cited by examiner

COATING WEIGHT CONTROL APPARATUS AND COATING WEIGHT CONTROL METHOD

TECHNICAL FIELD

The present disclosure relates to a coating weight control apparatus and a coating weight control method.

BACKGROUND ART

In a hot dipping process, coating weight of a steel sheet is controlled by air knife installed on each of a front (top) surface and a rear (bottom) surface of the steel sheet. In order to measure coating weight, a plating layer in a molten state needs to be completely dried, so that a coating weight gauge is positioned at a rear end about 200 m from the air knife. Accordingly, it is impossible to immediately control feedback, and operation is typically performed by appropriately adjusting an air knife gap that is a distance between the air knife and the steel sheet, and air knife pressure that is pressure of air sprayed from the air knife to the steel sheet with reference to experiences of operators or a setting table.

In the related art, there are methods of controlling coating mass by adjusting air knife pressure alone according to a change in a steel sheet speed (line speed) or adjusting an air knife gap alone in front/rear surfaces by a coating weight error by using a coating weight prediction model ("Coating mass control system design for a continuous galvanizing line", 1976, W. J. Edwards, etc.)

However, the method in the related art is the method of controlling coating weight by deriving the amount of change in the air knife gap and the air knife pressure according to the change in an operation condition, and there is a limit in directly deriving the air knife gaps and pressure appropriately to various kinds of steel and coating weight.

DISCLOSURE

Technical Problem

The present invention is to provide a coating weight control apparatus and a coating weight control method which are capable of improving accuracy of coating weight control, decreasing deviation of coating weight, and improving a surface quality, compared to an existing manual operation.

Technical Solution

According to one characteristic of the invention, an apparatus for controlling coating weight coated on a strip by using an air knife disposed in a travelling direction of the strip in a continuous plating process in which the strip is dipped in a molten metal pot and is coated includes: a prediction model unit including a prediction model in which a neural network is trained with accumulated operation conditions; and an optimum air knife condition calculation unit configured to derive an absolute value of at least one of an air knife gap and an air knife pressure by using the prediction model based on an input operation condition.

The air knife condition calculation unit may include: an air knife gap derivation unit which derives an air knife gap based on the input operation condition; and an air knife pressure derivation unit which derives an air knife pressure based on the input operation condition and the derived air knife gap by using the prediction model in which the neural network is trained with the accumulated operation conditions.

The air knife gap derivation unit may derive the air knife gap by using one or more methods among a method of deriving an air knife gap through a statistical method for operation conditions corresponding to the input operation condition in the database, a method of training a neural network with an operation condition except for an air knife pressure among the accumulated operation conditions and deriving an air knife gap by using the trained neural network, and a method of deriving an air knife gap corresponding to the input operation condition by using a look-up table.

The method of deriving the air knife gap through the statistical method in the database may use one or more of one among a mode, an average value, and a median value of data for the air knife gap corresponding to the input operation condition and data having the smallest coating weight error value between a target coating weight and measured coating weight among the data in the database.

The air knife gap derivation unit may derive a first air knife gap for one surface of the strip based on the input operation condition, and derive a second air knife gap for the other surface of the strip based on the input operation condition, and the air knife pressure derivation unit may include a first prediction model for one surface of the strip and a second prediction model for the other surface of the strip, derive a first air knife pressure for the one surface of the strip by applying at least the input operation condition and the first air knife gap to the first prediction model, and derive a second air knife pressure for the other surface of the strip by applying at least the input operation condition and the second air knife gap to the second prediction model.

The air knife pressure derivation unit may compare the first air knife pressure and the second air knife pressure, and correct the first air knife pressure and the second air knife pressure according to the comparison result.

When a difference between the first air knife pressure and the second air knife pressure is smaller than a predetermined threshold value, the air knife pressure derivation unit may output each of the first air knife pressure and the second air knife pressure, or when the difference between the first air knife pressure and the second air knife pressure is larger than the predetermined threshold value, the air knife pressure derivation unit may derive corrected first air knife pressure and second air knife pressure by adjusting the first air knife pressure and the second air knife pressure.

The air knife pressure derivation unit may perform an operation of deriving the corrected first air knife pressure and second air knife pressure by adjusting a difference between the first air knife pressure and the second air knife pressure to be equal to or smaller than a predetermined threshold value, and the optimum air knife condition calculation unit may further include an air knife gap correction unit which derives a corrected air knife gap for each of one surface and the other surface of the strip based on the corrected first and second air knife pressures by using the prediction model.

The air knife pressure derivation unit may derive an average of the first air knife pressure and the second air knife pressure as an optimum air knife pressure, and the optimum air knife condition calculation unit may further include an air knife gap correction unit which derives an air knife gap for each of one surface and the other surface of the strip based on the optimum air knife pressures again.

The apparatus may measure coating weight of the strip, and correct the prediction model based on a difference between the coating weight measurement value and a coating weight prediction value predicted by using the prediction model or target coating weight included in the input operation condition.

After the strip moves by a predetermined distance, the apparatus may correct a prediction value of the prediction model or the target coating weight input to the prediction model based on a difference between the coating weight measurement value and the coating weight prediction value or the target coating weight.

The apparatus may further include a memory array which stores each of the coating weight prediction value or the target coating weight and the coating weight measurement value in a corresponding cell while the strip moves by the predetermined distance.

According to another characteristic of the invention, a method of controlling coating weight coated on a strip by using an air knife disposed in a travelling direction of the strip in a continuous plating process in which the strip is dipped in a molten metal pot and is coated includes: training a neural network with accumulated operation conditions; and deriving an absolute value of at least one of an air knife gap and an air knife pressure by using the trained neural network based on an input operation condition.

The method may further include: building a prediction model by training the neural network with the accumulated operation conditions; deriving an air knife gap based on the input operation condition; and deriving an air knife pressure based on the input operation condition and the air knife gap by using the prediction model.

The deriving of the air knife gap may include at least one of deriving an air knife gap through a statistical method for operation conditions corresponding to the input operation condition in the database, training the neural network with an operation condition except for an air knife pressure among the accumulated operation conditions and deriving an air knife gap by using the trained neural network, and deriving an air knife gap corresponding to the input operation condition by using a look-up table.

The method of deriving the air knife gap through the statistical method in the database may use one or more of one among a mode, an average value, and a median value of data for the air knife gap corresponding to the input operation condition and data having the smallest coating weight error value between a target coating weight and measured coating weight among the data in the database.

The deriving of the air knife gap may include deriving a first air knife gap for one surface of the strip based on the input operation condition, and deriving a second air knife gap for the other surface of the strip based on the input operation condition, and the prediction model may include a first prediction model for one surface of the strip and a second prediction model for the other surface of the strip, and the deriving of the air knife pressure may include deriving a first air knife pressure for the one surface of the strip by applying at least the input operation condition and the first air knife gap to the first prediction model, and deriving a second air knife pressure for the other surface of the strip by applying at least the input operation condition and the second air knife gap to the second prediction model.

The method may further include comparing the first air knife pressure and the second air knife pressure, and correcting the first air knife pressure and the second air knife pressure according to the comparison result.

The method may further include: when a difference between the first air knife pressure and the second air knife pressure is smaller than a predetermined threshold value, outputting each of the first air knife pressure and the second air knife pressure; and when the difference between the first air knife pressure and the second air knife pressure is larger than the predetermined threshold value, deriving corrected first air knife pressure and second air knife pressure by adjusting the first air knife pressure and the second air knife pressure.

The method may further include: deriving a corrected first air knife pressure and second air knife pressure by adjusting a difference between the first air knife pressure and the second air knife pressure to be equal to or smaller than a predetermined threshold value; and deriving a corrected air knife gap for each of one surface and the other surface of the strip based on the corrected first and second air knife pressures by using a prediction model.

The deriving of the optimum air knife pressure may include deriving an average of the first air knife pressure and the second air knife pressure as an optimum air knife pressure.

The method may further include: deriving an average of the first air knife pressure and the second air knife pressure as an optimum air knife pressure; and deriving an air knife gap for each of one surface and the other surface of the strip based on the optimum air knife pressures again.

The method may further include: predicting coating weight by using the prediction model; measuring coating weight of the strip; and correcting the prediction model based on a difference between the coating weight measurement value and the coating weight prediction value or the target coating weight.

The correcting of the prediction model may include: after the strip moves by a predetermined distance, correcting a prediction value of the prediction model or the target coating weight based on the difference between the measured coating weight measurement value and the coating weight prediction value or the target coating weight.

The correcting of the prediction model may further include storing each of the coating weight prediction value or the target coating weight and the coating weight measurement value in a corresponding cell of a memory array while the strip moves by the predetermined distance.

The prediction model may be a coating weight prediction model, and be a model which receives the input operation condition as an input and predicts and outputs coating weight.

The operation condition may include any one or more of an operation condition related to a line in which the strip process is performed, an operation condition related to the air knife, and an operation condition related to the strip.

According to another characteristic of the present invention, in a strip produced according to the method of controlling coating weight, when target coating weight for the strip is changed from a first level to a second level, a stabilization distance in which measured coating weight reaches −3 to 3% of the target coating weight of the second level may be less than 50 M from a target coating weight change starting point, or a distance in which the measured coating weight converges to −1 to 1% of the target coating weight of the second level may be less than 250 M from a target coating weight change starting point.

According to another characteristic of the present invention, in a strip produced according to the method of controlling coating weight, within 200 M section from the target coating weight change starting point, when the strip is ultra-thin plated, a sum of both surfaces in a length direction of the strip may converge to a deviation of 0.25% or less based on a sum of target coating weight of front and rear surfaces of the strip, when the strip is medium-thin plated, the sum of both surfaces in the length direction of the strip may converge to a deviation of 0.66% or less based on a sum of target coating weight of the front and rear surfaces of the strip, and when the strip is post-plated, the sum of both surfaces in the length direction of the strip may converge to a deviation of 1% or less based on a sum of target coating weight of the front and rear surfaces of the strip.

According to another characteristic of the present invention, in a strip produced according to the method of controlling coating weight, a check mark in a diagonal pattern may not be generated on a surface of the strip.

Advantageous Effects

The present invention derives an operation condition of an air knife for implementing target coating weight by a coating weight prediction model, so that accuracy of the coating weight control is improved compared to an existing manual operation, thereby reducing a coating weight deviation and improving surface quality.

MODE FOR INVENTION

Figure 1:
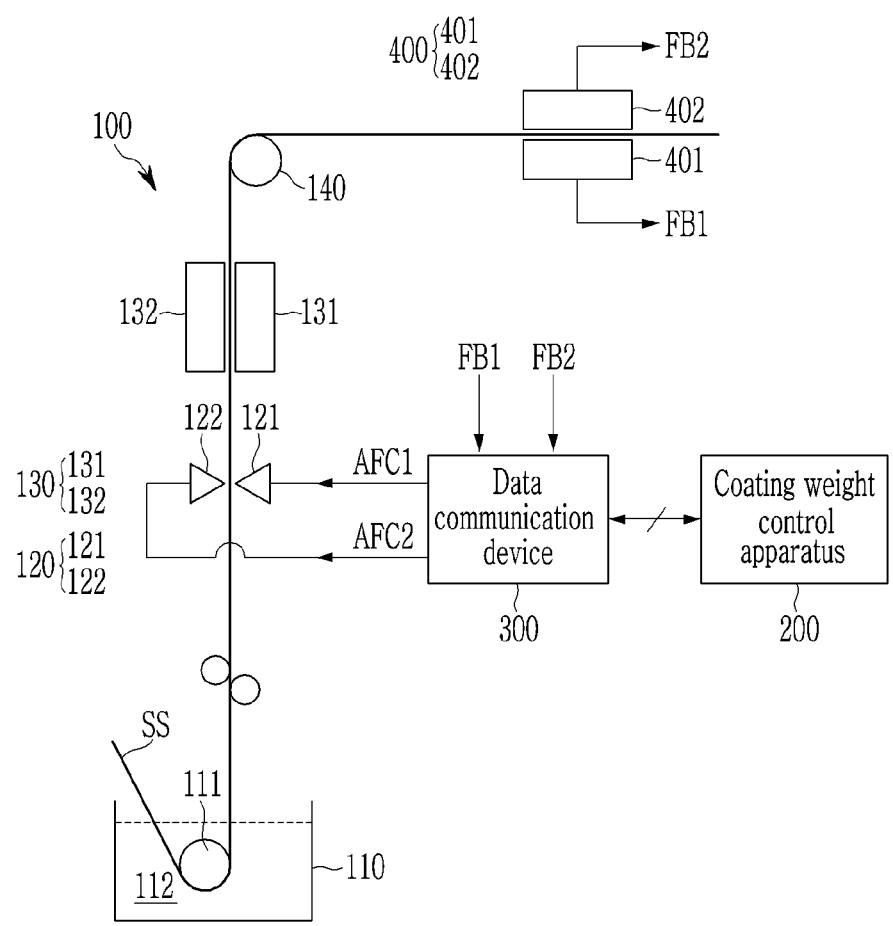
FIG. 1 is a diagram schematically illustrating a plating device and a coating weight control apparatus according to an exemplary embodiment.

In the following detailed description, only certain exemplary embodiments of the present invention have been shown and described, simply by way of illustration. However, the present invention can be variously implemented and is not limited to the following embodiments. Accordingly, the drawings and description are to be regarded as illustrative in nature and not restrictive. Like reference numerals designate like elements throughout the specification.

In a hot-dipping process (continuous galvanizing line), coating weight of a strip is controlled by two air knives installed on front (top) and rear (bottom) surfaces of the strip, respectively, and the coating weight is considerably affected by a distance between the air knife and the strip (air knife gap) and pressure of gas (air knife pressure) sprayed to one surface of the corresponding strip by the air knife. Hereinafter, in the present disclosure, a steel sheet is described as an example of the strip. However, the invention is not limited thereto, and the present invention is applicable to a metal plate, such as a magnesium plate, in the form of a strip.

In order to adjust coating weight of a surface of a steel sheet to target coating weight, a control method based on a regression model is applied. For example, as the method suggested by Edwards in 1976, there is a method of using a coating weight prediction model of Equation 1 which defines predicted coating weight CP as a function of a line speed V, an air knife gap D, and air knife pressure P.

$$CP = V^a G^b P^c \qquad \text{[Equation 1]}$$

In Equation 1, a, b, and c are model parameters, and are constants.

When the target coating weight is given by using the coating weight prediction model of Equation 1, an appropriate air knife gap and air knife pressure in a specific line speed may be inversely calculated. However, there are innumerable appropriate air knife gaps and air knife pressure, and when the air knife gap is excessively large or small, a surface quality may be decreased independent of coating weight, so that it is impossible to derive an optimum air knife operation condition (air knife gap and air knife pressure) only with the coating weight prediction model.

The present invention relates to an apparatus for controlling coating weight of a steel sheet by using an air knife, and implements a prediction model by training a neural network with an accumulated operation condition including at least an air knife gap and air knife pressure, and derives an absolute value of at least one of the air knife gap and the air knife pressure according to an input operation condition by using the prediction model.

The present invention derives an absolute value of the air knife gap and pressure, so that an initial control after the operation condition is changed is possible. When the operation condition, such as the kind of steel sheet, a line speed, a target coating weight, is changed, the current air knife gap and pressure is not appropriate as a reference for deriving a relative change amount of the air knife gap and pressure in the changed operation condition. In order to apply the relative change amount of the air knife gap and pressure to the control of the air knife gap and pressure, a current state (initial state) needs to be ensured as an optimum state. However, this is difficult to be ensured in an actual operation. Accordingly, according to the existing method of deriving a relative change amount of the air knife gap and pressure, it is difficult to accurately derive a relative change amount of an air knife gap and pressure for target coating weight after an operation condition is changed. The present invention may provide more accurately initial control by deriving absolute values of an air knife gap and pressure under a changed operation condition by training a neural network, without using an air knife gap and pressure before the change as a reference.

Further, in order to calculate a current relative change amount, when various operation conditions are changed at the same time, it is difficult to guarantee accuracy. For example, when the target coating weight and the line speed are changed at the same time, the result obtained by deriving the pressure change for the changed target coating weight and then deriving the pressure change for the changed line speed and summing the derived pressure changes may be different from the result obtained by calculating in the reverse order.

Further, when the coating weight is controlled with the relative change amount, it is difficult to reflect an operation know-how, such as a use of a specific gap for securing a surface quality in a specific steel type/condition. The present invention first derives an air knife gap appropriate to an input operation condition from the accumulated operation conditions, thereby solving the foregoing problem. The operation condition has a plurality of types, and the plurality of types may include, for example, steel sheet related data, air knife related data, line related data, and coating weight data. The steel sheet related data may include, for example, the kind, thickness, width, and vibration of the steel sheet. The air knife related data may include, for example, an air knife gap, air knife pressure, an air knife angle, and/or air knife height. The air knife gap may be a gap between the air knife and a center line to which the center of the steel sheet is to move. The air knife pressure may be pressure of air used in the air knife. The air knife height may be a height of the air knife relative to a hot surface of a plating pot. Air knife angle may be an angle of the air knife relative to a horizontal surface. Line related data may include, for example, a line speed and tension. The line speed may be the speed when the steel sheet moves in a travelling direction, and the tension may be tension for moving the steel sheet in the travelling direction. Accordingly, the operation condition may include target coating weight.

The exemplary embodiment relates to a coating weight control apparatus and a coating weight control method, which derive an air knife gap and pressure appropriate to an input operation condition by using a coating weight prediction model and accumulated operation conditions. In the exemplary embodiment, an error due to inaccuracy may be corrected by using the coating weight measured at the time of moving a predetermined distance for measuring the coating weight of the steel sheet.

For example, the air knife gap appropriate to an input operation condition may be first derived from the accumulated operation conditions, and the air knife pressure may be derived by using the derived air knife gap and the coating weight prediction model. Since the accumulated operation conditions are used, it is possible to derive the air knife gap to which know-how of the operator is reflected and automatically control the coating weight, which is capable of improving a surface quality through the derivation of the air knife gap. Further, in the exemplary embodiment, the air knife pressure sprayed to the front/rear surfaces of the steel sheet derived by the prediction model may be adjusted to be the same or the difference between the air knife pressures of the front/rear surfaces of the steel sheet may be adjusted to belong to a predetermined range, and the air knife gap may be corrected according to the adjusted air knife pressure. Further, in the exemplary embodiment, an error of the coating weight prediction model may be corrected by using the coating weight measurement value.

A coating weight prediction model may be expressed as a following function including other operation conditions as inputs, other than the line speed, the air knife gap, and the air knife pressure, by expanding the coating weight prediction model of Equation 1.

$$CP = F(V, G, P, \ldots)$$ [Equation 2]

In Equation 2, other operation conditions may include the kind of steel, a thickness, a width, vibration, and tension of the steel sheet, and air knife height and angle.

The coating weight prediction model of Equation 2 may be separately applied to each of the front surface and the rear surface of the steel sheet, and the function of Equation 2 satisfies the condition of Equation 3 below and the inverse function for G and P needs to exist under the condition that other input variables are constant.

$$\frac{\partial F}{\partial G} > 0,$$ [Equation 3]
$$\frac{\partial F}{\partial P} > 0$$

In the prediction of the coating weight, when the coating weight prediction model of Equation 2 is used, given the target coating weight (CP), it is possible to find the air knife gap and pressure for implementing the coating weight under the corresponding operation condition (the speed of the steel sheet and the like), and there are countless solutions.

In the exemplary embodiment, it is possible to find one optimum solution among the countless solutions by using a database in which the accumulated operation conditions are stored and the neural network trained with the accumulated operation conditions. To this end, the coating weight control apparatus according to the exemplary embodiment may store operation data in the form of [time, coil number, steel type, thickness, width, vibration, and tension of the steel sheet, line speed, air knife gap (top/bottom), air knife pressure (top/bottom), target coating weight, coating weight measurement value (top/bottom), air knife height, air knife angle (top/bottom), and the like] in the database in real time.

In the exemplary embodiment, the neural network which has the operation condition as an input and the coating weight as an output learns the operation condition stored in the database, and the coating weight prediction model may be implemented with the trained neutral network. However, the invention is not limited thereto, and the input and the output of the prediction model may be varied according to the design. In the exemplary embodiment, the coating weight prediction model implemented through the training of the neural network may find an optimum air knife pressure based on the first derived air knife gap and the operation condition including at least the target coating weight.

The coating weight control apparatus may derive the air knife gap through a statistical method for the operation conditions corresponding to the input operation condition in the database. The operation conditions corresponding to the input operation condition include the input same operation condition and similar operation conditions within a predetermined range. For example, the coating weight control apparatus may derive an air knife gap by using at least one of one among a mode, an average, and a median for the data of the corresponding air knife gap, and the air knife gap with the smallest coating weight error between the target coating weight and the measured coating weight among the data for the corresponding air knife gap.

Otherwise, the coating weight control apparatus may train the neutral network with the operation condition except for the air knife pressure, among the accumulated operation conditions, and derive the air knife gap under the input operation condition by using the trained neural network.

Otherwise, the coating weight control apparatus may derive the air knife gap corresponding to the input operation condition by using a look-up table for the accumulated operation conditions. The look-up table may include the operation conditions with high accuracy obtained in the operations performed by the skilled operators among the accumulated operation conditions. Otherwise, the look-up table may include operation conditions to which a unique feature of a line in which the plating operation is performed is reflected. The line is the combination of multiple facilities for the plating operation, so that each line may have a different feature in the operation. The different feature is reflected to the look-up table, so that it is possible to improve accuracy in the control of the coating weight.

The coating weight control apparatus according to the exemplary embodiment first derives the air knife gap, and derives the air knife pressure through the prediction model implemented through the training of the neural network.

The reason is that a flow of gas ejected from the air knife is almost similar regardless of the air knife pressure, so that the air knife gap has a great influence on the surface quality. Then, it is possible to prevent coating surface defects, such as flow patterns.

Further, in the exemplary embodiment, the coating weight prediction model may be separately applied to each of the front surface and the rear surface of the steel sheet, so that the air knife is spaced apart from each of the front surface and the rear surface of the steel sheet by a distance according to the air knife gap to spray gas according to the air knife pressure. That is, the plating process is separated for each of the front surface and the rear surface of the steel sheet, so that it is possible to separately apply the coating weight prediction model to each of the front surface and the rear surface. The coating weight control apparatus may derive the air knife pressure for implementing the target coating weight for each of the front and rear surfaces, and determine an optimum air knife pressure based on the derived front/rear-surface air knife pressures.

For example, the coating weight control apparatus may compare the front/rear-surface air knife pressures, and correct the front/rear-surface air knife pressures according to the comparison result. When the difference between the air knife pressures of the front and rear surfaces is large, vibration or pulling of the steel sheet may be caused by the pressure difference. Accordingly, in the exemplary embodiment, the difference between the front/rear-surface air knife pressures may be corrected so as not to deviate from a predetermined threshold value that may cause vibration or pulling of the steel sheet.

For example, when the difference between the front/rear-surface air knife pressures is smaller than the predetermined threshold value, each of the derived front/rear-surface air knife pressures may be used without changes. When the difference between the front/rear-surface air knife pressures is larger than the predetermined threshold value, the coating weight control apparatus may adjust the front/rear-surface air knife pressures and derive an optimum air knife pressure. In particular, the coating weight control apparatus may derive the optimum air knife pressure by adjusting the difference between the front/rear-surface air knife pressures to be equal to or smaller than the predetermined threshold value. For example, an average of the front/rear-surface air knife pressures may be determined as the optimum air knife pressure.

Otherwise, the coating weight control apparatus does not determine whether the difference between the air knife pressures is equal to or smaller than the threshold value, and may determine the average of the front/rear-surface air knife pressures as the optimum air knife pressure.

When the difference between the air knife pressures of the front and rear surfaces is large, vibration or pulling of the steel sheet may be caused by the pressure difference. In order to prevent the problem, in the exemplary embodiment, the average of the two air knife pressures derived from the front and rear models may be calculated and the same air knife pressure may be applied to the front and rear surfaces. In this case, in the exemplary embodiment, the air knife gap of each of the front and rear surfaces is derived again so as to correspond to the optimum air knife pressure by using the coating weight prediction model.

In the exemplary embodiment, an error of the coating weight prediction model may be corrected by measuring a coating weight prediction error. For example, the air knife gap monitored in an actual operation is simply a mechanical position of the air knife, so that the air knife gap does not accurately represent an actual distance between the air knife and the steel sheet. This is because the actual position of the steel sheet changes due to the thickness, tension, vibration, and the like of the steel sheet.

In order to correct the error caused by uncertainty, the coating weight control apparatus receives a feedback of actual coating weight measured at the rear end by a predetermined distance from the plating operation position (for example, the position of the air knife). For example, the coating weight control apparatus may receive a feedback of a coating weight measurement value measured at the rear end of approximately 200 m, and correct an error of the coating weight prediction model.

In the related art, since a movement distance of the steel sheet from the plating operation position to the actual coating weight measurement location for the feedback is long, the coating weight control apparatus takes a limited gain that reflects an error between the measurement value and the prediction value. According to the exemplary embodiment, the error of the coating weight prediction model is corrected through the feedback, such that the feedback control may be performed by the corrected coating weight prediction model without separately performing the feedback control. Then, the movement distance of the steel sheet required for converging the prediction value to the measurement value may be improved by the limited gain.

Hereinafter, the exemplary embodiment will be described with reference to the drawing. The description of an exemplary embodiment with reference to FIGS. 1 to 4 is the example for implementing the invention, and the invention is not limited thereto.

FIG. 1 is a diagram schematically illustrating a coating weight control apparatus and a plating device according to an exemplary embodiment.

As illustrated in FIG. 1, a plating device 100 is operated by the control of a coating weight control apparatus 200. In the exemplary embodiment, a data communication device 300 for transceiving information between the plating device 100 and the coating weight control apparatus 200 may be provided. The invention is not limited thereto, and a device for transceiving data may be provided in each of the plating device 100 and the coating weight control apparatus 200.

The plating device 100 includes a plating pot 110, an air knife 120, and a cooling part 130. In the exemplary embodiment, the plating device 100 may be a hot dipping device.

The plating pot 110 is for hot-dipping a steel sheet SS, and a molten metal is put in the plating pot, the steel sheet SS guided to the plating pot 110 is immersed in the molten metal 112 while passing a sink roll 111 disposed in the plating pot 110 to proceed with the hot-dipping process, and a surface of the steel sheet SS is coated.

The travelling direction of the steel sheet SS is changed by the sink roll 111, so that the steel sheet SS moves to the top of the plating pot 110. The steel sheet SS of which the surface is plated by the molten metal 112 within the plating pot 110 is withdrawn through the upper portion of the plating pot 110. The steel sheet SS is manufactured into a plated steel sheet via the air knife 120 and the cooling part 130 sequentially disposed in the travelling direction. The steel sheet SS cooled through the cooling part 130 proceeds to the process through a tension roll 140.

In the exemplary embodiment, as a plating solution, zinc, a zinc alloy, aluminum, and/or an aluminum alloy may be used.

The air knife 120 is disposed on one surface or both surfaces of the steel sheet at the rear end of the plating pot 110 in the travelling direction of the steel sheet SS to control coating weight of the steel sheet. The air knife 120 includes air knives 121 and 122, and the air knives 121 and 122 spray gas with air knife pressure to the plating layer attached to the surface of the steel sheet SS at a distance spaced by the air knife gap to control coating weight. For example, the air knife 120 has a body which is extended in a width direction of the steel sheet SS and inside which cryogenic liquid is circulated, and a tip (not illustrated) inclined by an air knife angle with respect to the plating layer of the steel sheet SS may be formed at the front end of the body.

The air knives 121 and 122 may control air knife gaps and pressures according to control signals AFC1 and AFC2, respectively. FIG. 1 illustrates that the control signals AFC1 and AFC2 are transmitted to the air knives 121 and 122 through the data communication device 300, but the invention is not limited thereto. Each of the air knives 121 and 122 may directly receive the control signals AFC1 and AFC2 from the coating weight control apparatus 200.

The cooling part 130 is in direct contact with the plating layer of the surface of the steel sheet SS to cool the steel sheet SS. For example, cooling bodies 131 and 132 may include cooling rolls (not illustrated) which are extended in the width direction of the steel sheet, have cryogenic liquid circulated therein, and are pressurized by the plating layer of the surface of the steel sheet to apply cooling air. The plurality of cooling rolls may be arranged in multiple stages at intervals along the travelling direction of the steel sheet SS.

The coating weight control apparatus 200 automatically controls an operation condition used in a plating operation of the plating device 100. The coating weight control apparatus 200 according to the exemplary embodiment may derive an air knife gap based on an input operation condition among the accumulated operation conditions, and derive an air knife pressure by inputting the derived air knife gap and the operation condition including at least target coating weight to a prediction model. Further, the coating weight control apparatus 200 may derive an optimum air knife pressure based on front/rear-surface air knife pressures, and correct front/rear-surface air knife gaps based on the optimum air knife pressure.

A coating weight measurement device 400 scans the front and rear surface of the steel sheet and measures coating weight of the front and rear surface of the steel sheet, and generates the measurement values FB1 and FB2. The coating weight measurement device 400 includes a front coating weight measurement unit 401 and a rear coating weight measurement unit 402, and the front coating weight measurement unit 401 generates the measurement value FB1 of the front coating weight and the rear coating weight measurement unit 402 generates the measurement value FB2 of the rear coating weight.

The data communication device 300 may collect operation data including the operation condition used for the plating operation in the plating device 100 and the coating weight measurement values FB1 and FB2 that are the values obtained by measuring the coating weight of the steel sheet plated under the operation condition in the plating device 100, and transmit the collected operation data to the coating weight control apparatus 200. Further, the data communication device 300 may receive data for an operation instruction from the coating weight control apparatus 200, and transmit a corresponding control signal to the plating device 100. The data communication device 300 may be implemented with a computing device which is capable of communicating with the plating device 100 and the coating weight control apparatus 200.

Figure 2:
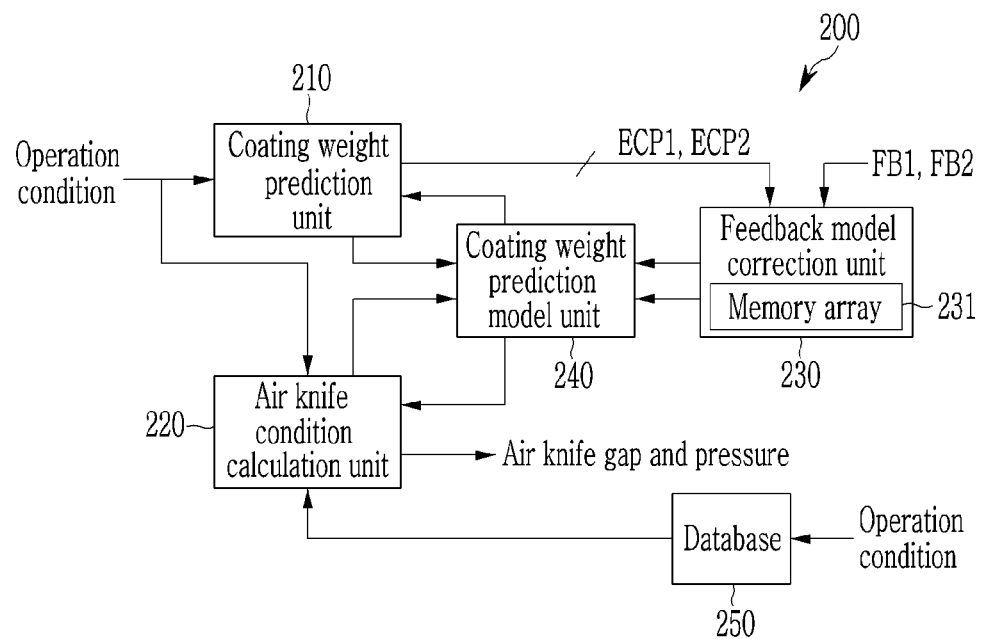
FIG. 2 is a diagram illustrating the coating weight control apparatus according to the exemplary embodiment.

FIG. 2 is a diagram illustrating the coating weight control apparatus according to the exemplary embodiment.

As illustrated in FIG. 2, the coating weight control apparatus 200 includes a coating weight prediction unit 210, an air knife condition derivation unit 220, a feedback model correction unit 230, a coating weight prediction model unit 240, and a database 250.

The database 250 may receive and store the data for the operation condition. The air knife condition derivation unit 220 may use the data stored in the database 250 when deriving the optimum air knife gap. FIG. 2 illustrates that the database 250 is included in the coating weight control apparatus 200, but the invention is not limited thereto, and the database 250 may be implemented as a separate device and may transceive data with the coating weight control apparatus 200.

The coating weight prediction model unit 240 includes a separate coating weight prediction model for each of the coating weight of the front and rear surfaces, and each coating weight prediction model may be implemented with the neural network trained with the accumulated operation condition.

The coating weight prediction unit 210 may predict coating weight by using the coating weight prediction model of the coating weight prediction model unit 240. For example, the coating weight prediction unit 210 may receive the operation condition and predicts and outputs front/rear-surface coating weight prediction values ECP1 and ECP2 according to the operation condition input through the front/rear-surface coating weight prediction model of the coating weight prediction model unit 240.

The air knife condition derivation unit 220 may derive optimum air knife gaps and optimum air knife pressures of the front and rear surfaces under the current operation condition by using the coating weight prediction model. The air knife condition derivation unit 220 may input one of the air knife gap and the air knife pressure and target coating weight to the coating weight prediction model, and count backward the coating weight prediction model to derive the remaining one of the air knife gap and the air knife pressure.

For example, the air knife condition derivation unit 220 may derive the front/rear-surface air knife gaps, derive the front/rear-surface air knife pressures by inputting the derived front/rear-surface air knife gaps and the target coating weight to the front/rear-surface coating weight prediction models of the coating weight prediction model unit 240, derive an optimum air knife pressure based on the derived front/rear-surface air knife pressures, and input the optimum air knife pressure and the target coating weight to the front/rear surface coating weight prediction models to derive the optimum front/rear-surface air knife gaps.

Figure 3:
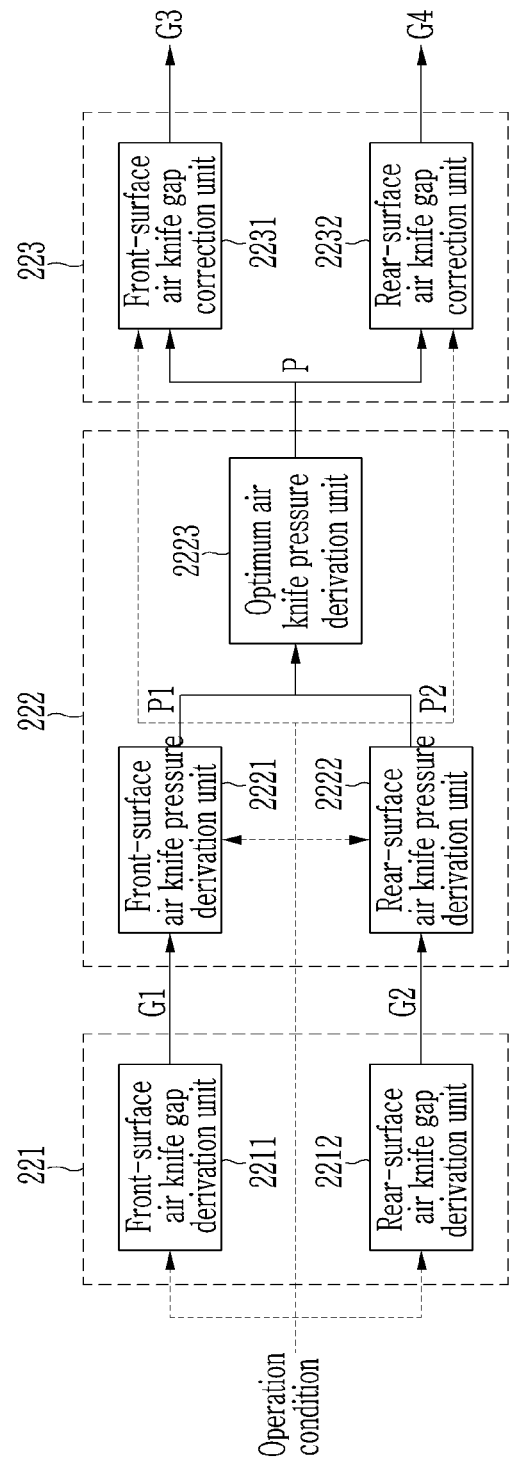
FIG. 3 is a diagram illustrating an air knife condition derivation unit according to the exemplary embodiment.

FIG. 3 is a diagram illustrating the air knife condition derivation unit according to the exemplary embodiment.

As illustrated in FIG. 3, the air knife condition derivation unit 220 includes an air knife gap derivation unit 221, an air knife pressure derivation unit 222, and an air knife gap correction unit 223.

The air knife gap derivation unit 221 includes a front-surface air knife gap derivation unit 2211 and a rear-surface air knife gap derivation unit 2212. The front/rear-surface air knife gap derivation units 2211 and 2212 may receive the operation condition and derive the front/rear-surface air knife gaps G1 and G2.

Each of the front/rear-surface air knife gap derivation units 2211 and 2212 may derive the air knife gap through a statistical method for the operation conditions corresponding to the input operation condition from the database 250. For example, each of the front/rear-surface air knife gap derivation units 2211 and 2212 may derive one of a mode, an average value, and a median of the air knife gaps of the operation conditions similar to the input operation condition. Each of the front/rear-surface air knife gap derivation units 2211 and 2212 may derive the air knife gap by using the air knife gap with the smallest coating weight error between the target coating weight and the measured coating weight among the air knife gaps of the operation conditions similar to the input operation condition.

Otherwise, each of the front/rear-surface air knife gap derivation units 2211 and 2212 may train the neural network with the operation condition except for the air knife pressure among the accumulated operation conditions, and derive the air knife gap under the input operation condition by using the trained neural network.

Otherwise, each of the front/rear-surface air knife gap derivation units 2211 and 2212 may derive the air knife gap corresponding to the input operation condition by using the look-up table related to the accumulated operation conditions In the exemplary embodiment, the look-up table may include the operation conditions with high accuracy obtained in the operation performed by the skilled in operators among the accumulated operation conditions. Otherwise, the look-up table may include the operation conditions to which a unique feature of the line in which the plating operation is performed is reflected. The line is the combination of multiple facilities for the plating operation, so that each line may have a different feature in the operation. The feature of the line is reflected to the look-up table, thereby improving accuracy in the control of the coating weight.

The air knife pressure derivation unit 222 includes a front-surface air knife pressure derivation unit 2221, a rear-surface air knife pressure derivation unit 2222, and an optimum air knife pressure derivation unit 2223.

The front-rear-surface air knife pressure derivation units 2221 and 2222 load the front-rear-surface coating weight prediction models from the coating weight prediction model unit 240. The front/rear surface air knife pressure derivation units 2221 and 2222 input at least a target coating weight and the front/rear-surface air knife gaps G1 and G2 among the operation conditions to the front/rear-surface coating weight prediction models, and the front/rear-surface coating weight prediction models generate the front/rear-surface air knife pressures P1 and P2 as outputs.

The optimum air knife pressure derivation unit 2223 calculates an average of the front/rear-surface air knife pressures P1 and P2 and derives an optimum air knife pressure P. The method of deriving the optimum air knife pressure is not limited to the averaging method. For example, as the averaging method, one of the various methods of deriving the same optimum air knife pressure by using the front/rear-surface air knife pressures P1 and P2 is applicable to the exemplary embodiment, or any one of the front/rear-surface air knife pressures P1 and P2 may be selected and applied to the exemplary embodiment.

Otherwise, the optimum air knife pressure derivation unit 2223 may compare the front/rear-surface air knife pressures P1 and P2 and correct the front/rear-surface air knife pressures according to the comparison result.

For example, when a difference between the front/rear-surface air knife pressures P1 and P2 is smaller than a predetermined threshold value, the optimum air knife pressure derivation unit 2223 may use each of the derived front/rear-surface air knife pressures P1 and P2 as it is. In this case, the air knife gap correction unit 223 is bypassed, so that "G1" and "G2" are output as the optimum air knife gaps without changes, and "P1" and "P2" are output as the optimum air knife pressures without changes.

When the difference between the front/rear-surface air knife pressures P1 and P2 is larger than the predetermined threshold value, the optimum air knife pressure derivation unit 2223 may derive the optimum air knife pressure by adjusting the front/rear-surface air knife pressures P1 and P2. For example, the optimum air knife pressure derivation unit 2223 may derive an average of the front/rear-surface air knife pressures P1 and P2 as the optimum air knife pressure P.

Otherwise, the optimum air knife pressure derivation unit 2223 may adjust the difference between the front/rear-surface air knife pressures P1 and P2 to be equal to or smaller than the predetermined threshold value and derive the optimum air knife pressure P. For example, the optimum air knife pressure derivation unit 2223 may determine the average of the front/rear-surface air knife pressures as the optimum air knife pressure P.

The air knife gap correction unit 223 includes a front-surface air knife gap correction unit 2231 and a rear-surface air knife gap correction unit 2232.

The front/rear-surface air knife gap correction units 2231 and 2232 input the operation condition including at least the target coating weight and the optimum air knife pressure P to the front/rear-surface coating weight prediction model of the coating weight prediction model unit 240, and the coating weight prediction model predicts and outputs optimum air knife gaps G3 and G4.

Finally, the air knife condition derivation unit 220 may output "G3", "G4", and "P" as the optimum air knife gaps and pressure. The optimum air knife gap and pressure are transmitted to the data communication device 300, and the data communication device 300 may generate control signals AFC1 and AFC2 based on the transmitted optimum air knife gap and pressure and transmit the generated control signals AFC1 and AFC2 to the air knives 121 and 122.

The feedback model correction unit 230 may receive the front/rear-surface coating weight measurement values FB1 and FB2 and the front/rear-surface coating weight prediction values ECP1 and ECP2, and correct the coating weight prediction model based on the difference between the front/rear-surface coating weight measurement values FB1 and FB2 and the front/rear-surface coating weight prediction values ECP1 and ECP2. The present invention is not limited thereto, and the coating weight prediction model may be corrected by using the target coating weight, instead of the front/rear-surface coating weight prediction values ECP1 and ECP2. That is, the feedback model correction unit 230 may correct the coating weight prediction model based on the difference between the input target coating weight and the front/rear-surface coating weight measurement values FB1 and FB2.

For example, the feedback model correction unit 230 may calculate an average of the differences between the two values while the steel sheet moves a predetermined error calculation section (for example, 10 to 15 m) and transmits average errors ER1 and ER2 to the coating weight prediction model unit 240.

The coating weight prediction model unit 240 may reflect the average errors ER1 and ER2 and correct the front/rear-surface coating weight prediction models.

The feedback model correction unit 230 includes a memory array 231 for accurately matching the locations of the front/rear surface coating weight prediction values ECP1 and ECP2 or the input target coating weight and the locations of the coating weight measurement values FB1 and FB2.

Figure 4:
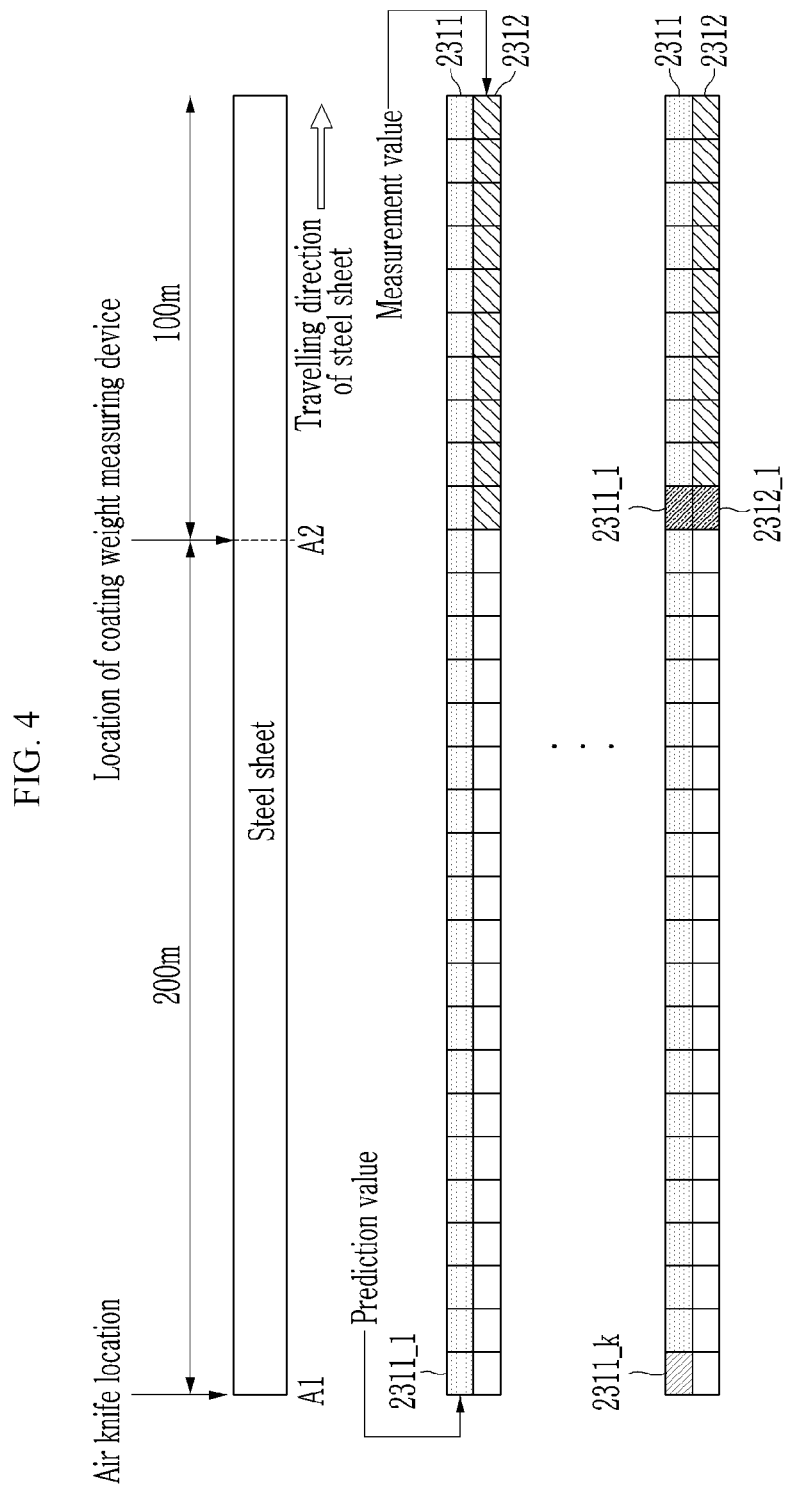
FIG. 4 is a diagram illustrating a memory array according to the exemplary embodiment.

FIG. 4 is a diagram illustrating the memory array according to the exemplary embodiment.

As illustrated in FIG. 4, each of the front/rear surface coating weight prediction values ECP1 and ECP2 or the input target coating weight and the coating weight measurement values FB1 and FB2 is stored in the memory array 2311 and 2312 corresponding to the corresponding locations. For example, the steel sheet is divided at a predetermined interval (for example, 1 m) in the travelling direction of the steel sheet, and each of the front/rear surface coating weight prediction values ECP1 and ECP2 or the input target coating weight and the coating weight measurement values FB1 and FB2 in each region is stored in a corresponding cell of each of the memory arrays 2311 and 2312.

The memory array cell is shifted according to the speed of the steel sheet so as to match the position of the steel sheet from the air knives 121 and 122 to the coating weight measurement devices 401 and 402.

As illustrated in FIG. 4, in synchronization with a time point at which the steel sheet reaches the air knife location A1, the front/rear-surface coating weight prediction values ECP1 and ECP2 or the input target coating weight may be stored in the corresponding cell of the memory array 2311. Whenever the steel sheet passes the air knife location A1 by a predetermined interval (1 m), the cell is shifted, and the front/rear-surface coating weight prediction values ECP1 and ECP2 or the input target coating weight are stored in the corresponding cell of the memory array 2311.

When the steel sheet reaches a measurement device position A2, the front/rear-surface coating weight measurement values FB1 and FB2 are stored in a corresponding cell 2312_2 of the memory array 2312. Whenever the steel sheet passes the air knife location A2 by a predetermined interval (1 m), the cell of the memory array 2312 is shifted, and the front/rear-surface coating weight measurement values FB1 and FB2 are stored in the corresponding cell of the memory cell 2311.

When the region of the steel sheet corresponding to the cell 2311_1 reaches the coating weight measurement device position A2 and the front/rear-surface coating weight measurement values FB1 and FB2 are stored in the cell 2312_1, the feedback model correction unit 230 calculates a difference between the front/rear-surface coating weight measurement values FB1 and FB2 stored in the cell 2312_1 and the front/rear-surface coating weight prediction values ECP1 and ECP2 stored in the cell 2311_1 or the input target coating weight.

Through the foregoing method, the feedback model correction unit 230 may obtain an average of the differences between the two values calculated while the steel sheet passing through the coating weight measurement device position A1 moves the predetermined error calculation section and calculate average errors ER1 and ER2. The ER1 is the average error obtained by averaging FB1-ECP1 in the error calculation section, and the ER2 is the average error obtained by averaging FB2-EPC2 in the error calculation section.

Then, the coating weight prediction model unit 240 corrects the coating weight prediction model based on the average errors ER1 and ER2. For example, the coating weight prediction model unit 240 may reflect the average error to the target coating weight or reflect the average error to the predicted coating weight.

For example, the coating weight prediction model unit 240 may decrease the target coating weight by the average error ER1 or ER2, or increase the coating weight prediction value by the average error ER1 or ER2.

After the coating weight prediction model unit 240 corrects the coating weight prediction model, the coating weight prediction model unit 240 stands by until the portion predicted by the corrected coating weight prediction model passes the coating weight measurement device position A2. In this case, the period of the feedback model correction is represented by Equation 4.

$$\text{Feedback model correction period} = [\text{time for steel sheet to move distance } A1-A2] + [\text{time for steel sheet to move error calculation section}] + [\text{scan time of coating weight measurement device}] \quad [\text{Equation 4}]$$

The correction period of the coating weight prediction model needs to be longer than the feedback model correction period, and when the correction period of the coating weight prediction model is shorter than the feedback model correction period, hunting may occur. The corrected coating weight prediction model is used for the reverse operation in the air knife condition derivation unit again, so that the effect of the feedback control may be provided.

Further, whenever the coating weight measurement devices 401 and 402 scan the steel sheet once for the measurement of the coating weight, the scan time may be calculated according to the width of the steel sheet and the line speed, and the feedback model correction period may be determined. For example, the scan time t may be calculated as $t=ax+by+c$ according to the width x of the steel sheet and the line speed y. In this case, a, b, and c are the constants determined according to the design. That is, by calculating the scan time according to the width of the steel sheet and varying the feedback model correction period according to the steel sheet, it is possible to more precisely control the coating weight in a coil to decrease the coating weight deviation from 1.6% to about 0.25% based on the target coating weight.

Figure 5:
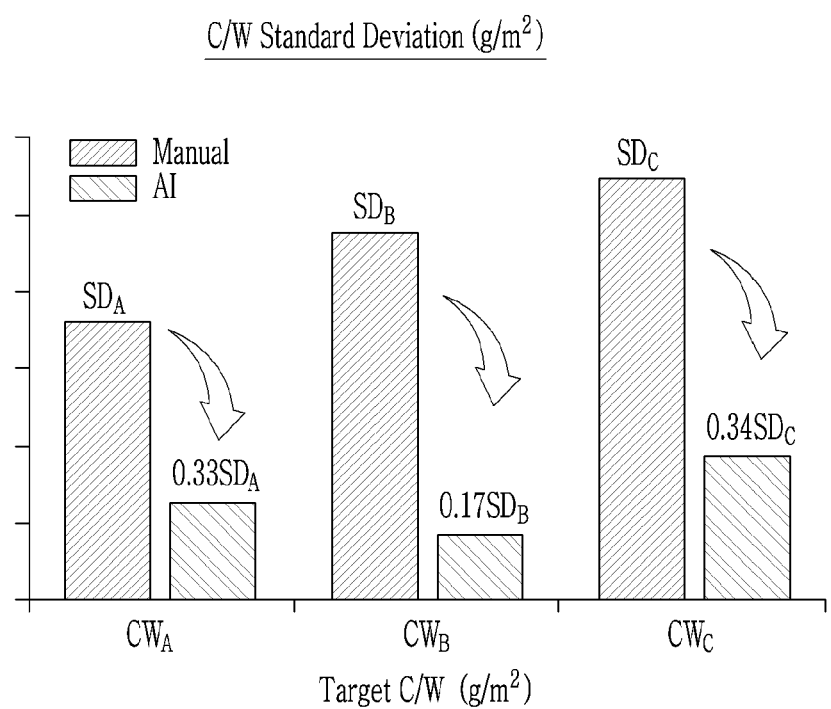
FIG. 5 is a graph illustrating a deviation of coating weight according to the exemplary embodiment and a deviation of coating weight in an existing manual operation.

FIG. 5 is a graph illustrating a deviation of coating weight according to the exemplary embodiment and a deviation of coating weight in an existing manual operation.

As illustrated in FIG. 5, it can be seen that in each of the target coating weight $CW_A$, $CW_B$, and $CW_C$, a coating weight deviation according to the exemplary embodiment is considerably improved compared to a coating weight deviation in the existing manual operation.

In particular, when the coating weight deviations for the target coating weight $CW_A$, $CW_B$, and $CW_C$ by the existing manual operation are $SD_A$, $SD_B$, and $SD_C$, in the case where the coating weight is controlled according to the exemplary embodiment, the coating weight deviations are decreased to $0.33SD_A$, $0.17SD_B$, and $0.34SD_C$.

When the coating weight deviation is decreased, an actual plating application instruction amount for achieving the customer-ordered coating weight may be significantly decreased compared to the related art. For example, when an actual plating application instruction amount for achieving the customer-ordered coating weight in the related art is the overcoating instruction of 3.22% of the sum of both surfaces, in the case of using the exemplary embodiment, the overcoating instruction may be decreased to 0.499% of the sum of both surfaces. Then, the effect in which the overcoating weight for achieving the customer-ordered coating weight is reduced compared to the related art may be provided.

Edge build-up, flow patterns, and check marks generated by the manual operation in the related art may not be visible to the naked eye because the degree thereof is weak after a Skin Pass Mill (SPM) process. However, in the case where a surface inspection (grindstone inspection) is performed for a length of at least 5 m once for the full width by using grindstone in a vertical or horizontal inspection table, all of the edge build-up, flow patterns, and check marks are revealed.

For example, in a plated steel sheet in which a cold-rolled steel sheet that is a raw material is 0.4 t or less and the coating weight of both surfaces is 140 g/m² or more, edge build-up is generated by the existing manual operation. The coating weight control apparatus and method according to the exemplary embodiment may learn the air knife conditions (for example, pressure and gap) under which the edge build-up is not generated and automatically control the coating weight, thereby preventing edge build-up.

A temperature of the steel sheet in a region immediately after the coating weight is controlled by a pressure and a flow rate of a fluid in the air knife is, for example, before/after 430° C. Then, the region immediately after the coating weight is controlled is in the initial state of solidification, and an oxide film is formed on a surface of the corresponding region, but the shear stress generated when the fluid exits from the air knife after colliding with the steel sheet applies physical force to the unsolidified oxide film layer. In this case, when the force exceeds threshold stress required for the rupture of the oxide film, a fine wave is induced, so that a wave mark that is the dark coating flow mark in the form of a wave pattern is generated on the front and rear surfaces of the plated steel sheet.

For example, when a long-distance air knife gap (for example, 10 mm or more) is used for controlling the coating weight for a post-plated material, the variable amount of the air knife gap is changed to a minimum of 2 mm or more in order to meet the coating weight. Then, a flow pattern is generated on the surface of the steel sheet. The coating weight control apparatus and method according to the exemplary embodiment may learn a boundary condition under which the flow pattern is generated and prevent the flow pattern.

Further, under the specific condition, such as a line speed, wiping pressure, and viscosity of a molten metal, the molten metal which is attached to the strip to move up and the molten metal which moves down by wiping flows, so that a pattern is generated in a semicircle in the width direction of the strip. That is, the flow phenomenon of the molten metal in the lower portion of the air knife generates a diamond-shaped check pattern in a certain pattern, resulting in a check mark.

For example, in the case where the line speed is constant in the control of the medium-thin coating weight in the related art, the check mark may be generated. The coating weight control apparatus and method according to the exemplary embodiment may learn the boundary condition under which the check mark is generated and prevent the check mark based on the result of the determination through a surface defect detection device (SDD).

In the exemplary embodiment of the present invention, the air knife gap is first derived, and the air knife pressure is derived based on the derived air knife gap. The exemplary embodiment is applicable to the case where a variation width of the coating weight between the continuous coils in the steel sheet is equal to or larger than a predetermined value.

The process of the hot dipping facility is a continuous process due to the nature of the operation, and when the air knife gap and pressure are continuously derived and changed at the same time, despite aiming to converge to the target coating weight, an incorrect air knife gap and pressure are derived due to an incorrect answer (Local Minima) during the optimization process, so that the actual coating weight may not converge to the target coating weight.

For example, in the result of feedback after scanning by the coating weight measurement device, even though the optimum value of the air knife pressure has been already found, when the air knife gap and pressure are derived at the same time, the air knife pressure is changed while the air knife gap is optimized. Then, there is a phenomenon that the correct answer (global minima) the air knife gap and pressure for achieving the target coating weight is not found and the answer is continuously incorrect, so that the coating weight control is continuously repeated to find the optimum value.

In this situation, when an operator of the hot-dipping facility fails to respond appropriately, the strip may pass through the air knife in overcoating and under-coating state, making it impossible to control the coating weight.

The present invention derives a relatively accurate value between the air knife gap and pressure from the accumulated operation conditions or first fixes the accurate value by using the neural network trained with the accumulated operation conditions and then controls the remaining factors through the coating weight prediction model, thereby considerably decreasing the probability of falling into the wrong answer (local minima).

According to the exemplary embodiment, when the target coating weight is changed from a first level to a second level, a stabilization distance at which the measured coating weight reaches −3% to +3% of the target coating weight of the second level is less than 50 M from the starting point at which the target coating weight is changed from the first level to the second level.

Further, when the target coating weight is changed from the changed first level to the second level, a distance at which the measured coating weight converges to −1% to +1% of the target coating weight of the second level is less than 250 M from the starting point at which the target coating weight is changed from the first level to the second level.

According to the exemplary embodiment, within 200 M section from the change point of the target coating weight, when the strip is an ultra-thin plated product (for example, a product of 100 g/m² or less), the sum of both surfaces in the length direction of the strip may converge to a deviation of 0.25% or less based on the sum of the target coating weight of the front and rear surfaces of the strip, when the strip is a medium-thin plated product (a product of 101~180 g/m²), the sum of both surfaces in the length direction of the strip may converge to a deviation of 0.66% or less based on the sum of the target coating weight of the front and rear surfaces of the strip, or when the strip is a post-plated product (a product of 180~300 g/m²), the sum of both surfaces in the length direction of the strip may converge to a deviation of 1% or less based on the sum of the target coating weight of the front and rear surfaces of the strip.

For reference, a ratio of the target coating weight (CW2) of the subsequent coil to the target coating weight (CW1) of the preceding coil may be 0.29 to 3.43.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. An apparatus for controlling coating weight coated on a steel strip by using an air knife disposed in a travelling direction of the steel strip in a continuous plating process in which the steel strip is dipped in a molten metal pot and is coated, the apparatus comprising:
   a prediction model unit including a coating weight prediction model in which a neural network is trained with accumulated operation conditions; and
   an optimum air knife condition calculation unit configured to derive an absolute value of at least one of an air knife gap and an air knife pressure by using the coating weight prediction model based on an input operation condition,
   wherein the accumulated operation conditions and the input operation condition comprise: a line speed of the steel strip; an air knife gap; and an air knife pressure,
   wherein the optimum air knife condition calculation unit includes:
   an air knife gap derivation unit which derives an air knife gap based on the input operation condition by using the coating weight prediction model; and
   an air knife pressure derivation unit which derives an air knife pressure based on the input operation condition and the derived air knife gap by using the coating weight prediction model,
   wherein the air knife gap derivation unit derives a first air knife gap for one surface of the steel strip based on the input operation condition, and derives a second air knife gap for the other surface of the steel strip based on the input operation condition, and
   wherein the air knife pressure derivation unit includes a first prediction model for one surface of the steel strip and a second prediction model for the other surface of the steel strip, derives a first air knife pressure for the one surface of the steel strip by applying at least the input operation condition and the first air knife gap to the first prediction model, and derives a second air knife pressure for the other surface of the steel strip by applying at least the input operation condition and the second air knife gap to the second prediction model.

2. The apparatus of claim 1, wherein:
the air knife pressure derivation unit
compares the first air knife pressure and the second air knife pressure, and
outputs each of the first air knife pressure and the second air knife pressure when a difference between the first air knife pressure and the second air knife pressure is smaller than a predetermined threshold value.

3. The apparatus of claim 2, wherein:
when the difference between the first air knife pressure and the second air knife pressure is larger than the predetermined threshold value, the air knife pressure derivation unit derives a corrected first air knife pressure and a corrected second air knife pressure by adjusting the first air knife pressure and the second air knife pressure.

4. The apparatus of claim 1, wherein:
the air knife pressure derivation unit
performs an operation of deriving a corrected first air knife pressure and a corrected second air knife pressure by adjusting a difference between the first air knife pressure and the second air knife pressure to be equal to or smaller than a predetermined threshold value, and
the optimum air knife condition calculation unit
further includes an air knife gap correction unit which derives a corrected air knife gap for each of the one surface and the other surface of the steel strip based on the corrected first and second air knife pressures by using the coating weight prediction model.

5. The apparatus of claim 1, wherein:
the air knife pressure derivation unit
derives an average of the first air knife pressure and the second air knife pressure as an optimum air knife pressure, and
the optimum air knife condition calculation unit
further includes an air knife gap correction unit which derives an air knife gap for each of the one surface and the other surface of the steel strip based on the optimum air knife pressure.

6. The apparatus of claim 1, wherein:
a coating weight of the steel strip is measured, and the coating weight prediction model is corrected if a difference between the coating weight measurement value and a coating weight prediction value predicted by using the coating weight prediction model is determined.

7. The apparatus of claim 6, wherein:
after the steel strip moves by a predetermined distance, a prediction value of the coating weight prediction model or a target coating weight input to the coating weight prediction model are corrected if a difference between the coating weight measurement value and the coating weight prediction value is determined.

8. The apparatus of claim 7, further comprising:
a memory array which stores each of the coating weight prediction value or the target coating weight and the coating weight measurement value in a corresponding cell while the steel strip moves by the predetermined distance.

9. The apparatus of claim 1, wherein:
the coating weight prediction model is a model which uses the input operation condition as an input and predicts and outputs a coating weight.

10. The apparatus of claim 1, wherein:
the air knife gap derivation unit derives the derived air knife gap by using a look-up table.

11. The apparatus of claim 1, wherein:
coating weight of the steel strip is measured, and the coating weight prediction model is corrected if a difference between the coating weight measurement value and a target coating weight included in the input operation condition is determined.

12. The apparatus of claim 11, wherein:
after the steel strip moves by a predetermined distance, a prediction value of the coating weight prediction model or the target coating weight input to the coating weight prediction model are corrected if a difference between the coating weight measurement value and the target coating weight is determined.

13. The apparatus of claim 1, wherein:
the accumulated operation conditions and the input operation condition further comprise: an air knife height; air knife angle; and at least one of a kind of the steel strip, a thickness of the steel strip, a width of the steel strip, a vibration of the steel strip, and a tension of the steel strip.

* * * * *